United States Patent [19]

Ridgway et al.

[11] Patent Number: 4,871,327
[45] Date of Patent: Oct. 3, 1989

[54] COMBINED ELECTRICAL GROUNDING AND MECHANICAL LOCKING MEANS FOR CEILING MOUNTED DEVICE

[75] Inventors: Paul A. Ridgway, Julian; William P. Butterfield, Ramona, both of Calif.

[73] Assignee: H.P. Incorporated, Ramona, Calif.

[21] Appl. No.: 271,897

[22] Filed: Nov. 14, 1988

[51] Int. Cl.⁴ .......................................... H01R 13/73
[52] U.S. Cl. .................................. 439/543; 439/576; 403/379
[58] Field of Search ............... 439/529, 531, 533, 542, 439/543, 576, 100, 450; 403/378, 379

[56] References Cited

U.S. PATENT DOCUMENTS

| | | | |
|---|---|---|---|
| 323,248 | 7/1885 | Wolf | 403/379 |
| 4,755,077 | 7/1988 | Eckle | 403/279 |
| 4,810,207 | 3/1989 | Butterfield | 439/529 |

FOREIGN PATENT DOCUMENTS 480927  8/1929  Fed. Rep. of Germany ...... 403/378

Primary Examiner—Gary F. Paumen
Attorney, Agent, or Firm—Brown, Martin, Haller, & McClain

[57] ABSTRACT

An apparatus is provided for simultaneously electrically grounding and mechanical securing an electric device to an overhead support which comprises a generally downwardly depending downrod attached to the support; a coupling for engaging the lower end portion of the downrod to an upwardly extending hub with the mutually interfitting walls of the downrod end and the hub coupled in a male-female jointed configuration; a pair of openings in opposite sides of each of the interfitting walls, which openings are aligned; and a rod extending through the aligned openings, which rod has a head at one end in contact with the outer surface of the inner of the downrod and the hub and a thread portion opposite to the head for engaging an internal thread of the opposite opening in the outer of the downrod and hub. The apparatus ensures electrical grounding continuity and at the same time establishes a secure mounting configuration.

8 Claims, 2 Drawing Sheets

COMBINED ELECTRICAL GROUNDING AND MECHANICAL LOCKING MEANS FOR CEILING MOUNTED DEVICE

FIELD OF INVENTION

The invention herein relates to apparatus for electrically grounding and mechanically suspending electrical devices from overhead supporting structures.

BACKGROUND OF THE INVENTION

Because of the common use of overhead mounted electrical devices such as lights and fans by the ordinary consumer, safety considerations must be incorporated in the design of such devices. Proper grounding of electrically conducting parts and components is essential for reducing the risk of electric shocks. In many designs, electrical conductivity for grounding the various parts is provided through direct metal-to-metal contact. This is exemplified by one design of an overhead electric-motor-driven fan having a hanger configuration where the downrod has a threaded end onto which the motor housing is screwed. The screw threads between the interconnecting parts provide the direct metal-to-metal contact.

Another example of providing grounding to an overhead electric device is shown in U.S. Pat. No. 4,810,207, issued Mar. 7, 1989, by the same inventors as herein. That application describes an apparatus for releasably, electrically and mechanically attaching an electric-motor-driven device to an overhead support. The electrical connections are made simultaneously as the unit is being mechanically mounted. To assure electrical grounding, a set screw is used as the primary conducting means between the downrod and the motor housing. The use of a set screw, however, tends to push the downrod off-center and skews the assembly. This often leads to manufactures utilizing two or more set screws at spaced positions around the downrod, which merely increases the complexity of this device and its installation.

Another consideration affecting the safety of such devices is that they must be mounted or hung securely to prevent them from falling from their overhead attachment. For motor-operated overhead devices such as fans, this safety aspect is especially complex. The device is not only subject to the static gravitational force of its own weight, but also to the dynamic load created during operation. Vibration often occurs with imbalance in the moving parts of the appliance, which can cause the device to become loosened from its mounting and fall. For example, one type of overhead fan utilizes a threaded end on a downrod from the overhanging support structure for mounting the device. A set screw is provided to bear upon the threads to prevent the relative movement of the connecting parts. The fan rotation is normally in the direction of the threads. Of course, in reverse rotation, the fan will then operate in a direction counter to the threading. If the set screw is loosened during reverse fan rotation, the housing can become unscrewed from the downrod and fall, causing injuries to people or damage to property. The loosened set screws may also lead to grounding interruption.

It would therefore be advantageous to have a means to positively secure an overhead electrical device in place and at the same time establish positive electrical grounding continuity. Further, it would be advantageous that such means be able to withstand anticipated imbalances and vibrations of a dynamic load and to resist the rotational forces of motor rotation, regardless of the direction of rotation. In addition, it would be of particular interest for the means to be such that simple mounting and demounting would be possible so as to permit quick and easy installation and maintenance.

BRIEF SUMMARY OF THE INVENTION

This invention provides an apparatus for releasably electrically and mechanically attaching an electrical device to an overhead support which comprises a downrod depending downwardly from the support and attached thereto and coupling means to couple the lower end of the downrod to an upwardly extending hub on the device. The coupling means comprises a male-female joint between the downrod and the hub, with mutually interfitting walls; aligned openings in said interfitting walls for accommodating rod means which extends therethrough; the rod means having a head at one end of the rod, which passes through one of said openings in the outer of the downrod and hub and contacts the outer surface of the wall of the inner of the downrod and hub; and a threaded portion at the other end of the rod for engaging an internal thread of the opposite opening in the outer of the downrod and hub. The rod means electrically and mechanically secures the downrod and the hub.

In one embodiment of the invention, the downrod is fitted within the hub. Alternatively, the hub can be fitted within the lower portion of the downrod.

The rod means is made of high strength material such as steel. One design of the rod means is a steel bolt having serrations at the root of the bolt head to establish a secured contact with the exterior wall of inner of the downrod and hub. The rod means may also be provided with an extended end portion having a lateral hole so a cotter pin may be inserted to further secure the rod's engagement.

The present invention is also applicable to a downrod with a lower portion having threads that are interfitting with threads on the hub for mutual coupling. A bolt passes through aligned holes on the threaded surfaces to mechanically secure the physical coupling between the downrod and the hub.

In other embodiments of this invention, the invention further comprises male-female electrical contacts such that when the downrod and the hub are connected to each other, these electrical contacts will be engaged.

The invention described herein therefore provides a positive and secured means for connecting the downrod to the hub and at the same time ensures electrical grounding continuity.

DETAILED DESCRIPTION AND PREFERRED EMBODIMENTS

Figure 1:
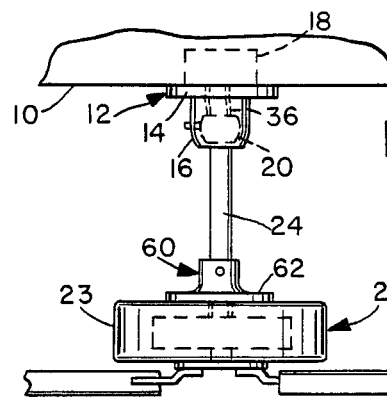
FIG. 1 is a side elevation view of a typical ceiling fan installation.

FIG. 1 shows the invention in a typical environment, in this case exemplified by a ceiling fan fixture. The device is suspended downwardly from an overhead structure such as ceiling 10. This overhead structure may be a conventional ceiling, a ceiling joist, an overhead grid system or any similar structure. In the embodiments shown, the overhead structure is a horizontal ceiling 10. It may, however, as in the case of a cathedral ceiling, be sloped at an angle. Attached directly to ceiling 10 is a mounting device 12 which comprises a base 14 to which is attached a housing 16. Mounting device 12, base 14 and housing 16 are normally electrically grounded as a safety practice through suitable fastening and connecting means with an electrical ground as done in the industry. Positioned above mounting device 12 is junction box 18. The mounting device 12 is conventional and is attached to the ceiling 10 through the base 14 and by ordinary fastening means such as screws (not shown). The upper portion 20 of downrod 24 is mounted at housing 16. The mounting method and means are conventional and known within the industry. Likewise, it is also known that the electric device 22 can be hung vertically downward from the mounting device 12 regardless of whether the ceiling is horizontal or sloped. The interior of housing 16 communicates with the interior of junction box 18 such that electrical wires 38 can be extended from housing 16 into junction box 18 for connection with an electrical power supply.

Downrod 24 is of metallic construction, which is typical of many overhead electric device hanger assemblies. The metallic construction provides adequate strength to withstand the static and dynamic loads of the device. In the present invention, a metallic downrod further serves as a conductor for electrical grounding. This eliminates the need for an additional grounding wire passing through the interior of the downrod 24 for connection between the ground and the electric device 22, as well as the additional step in making grounding wire connection for the device.

Figure 2:
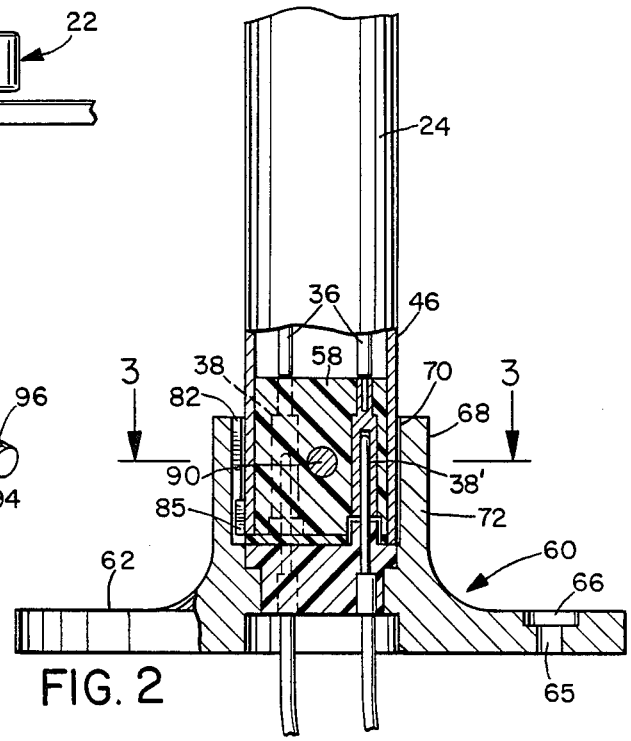
FIG. 2 is an enlarged side elevation view, partially cut away, of the lower end of the mounting structure for an overhead electric device.

FIG. 2 shows in detail the lower portion of downrod 24, which is attached to the hub 60 of the overhead electric device 22 of FIG. 1. Hub 60 may be a separate part which is attached to casing 23 for the device. Alternatively, it can be an integral part of the hub (for example, molded as a one piece unit for the rest of the hub). In the embodiment illustrated, the hub 60 is a separate part attached to the motor housing 23, by having extended base flange 62 of hub 60 connected directly to housing 23 by conventional means such as bolts penetrating through holes 65 and seated in counterbores 66. Similar to the downrod 24, the hub 60 is of metallic construction to provide strength as well as to facilitate electrical grounding.

Extending upwardly from the flange 62 of hub 60 is an annular sleeve 68. Sleeve 68 contains a central recess 70 which is defined by an annular outer wall 72. The lower portion of downrod 24 and the annular sleeve 68 are mutually interfitting to establish a male-female jointing relationship. In the embodiment shown in FIG. 2, the lower portion of downrod 24 is sized to fit within recess 70 of the annular sleeve 68.

Figure 4:
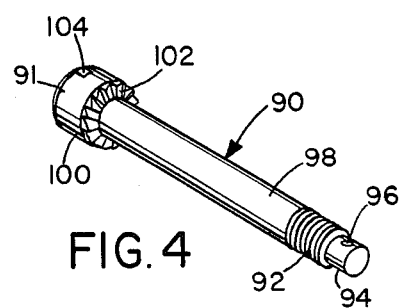
FIG. 4 is a perspective view of a bolt useful in this invention.
Figure 3:
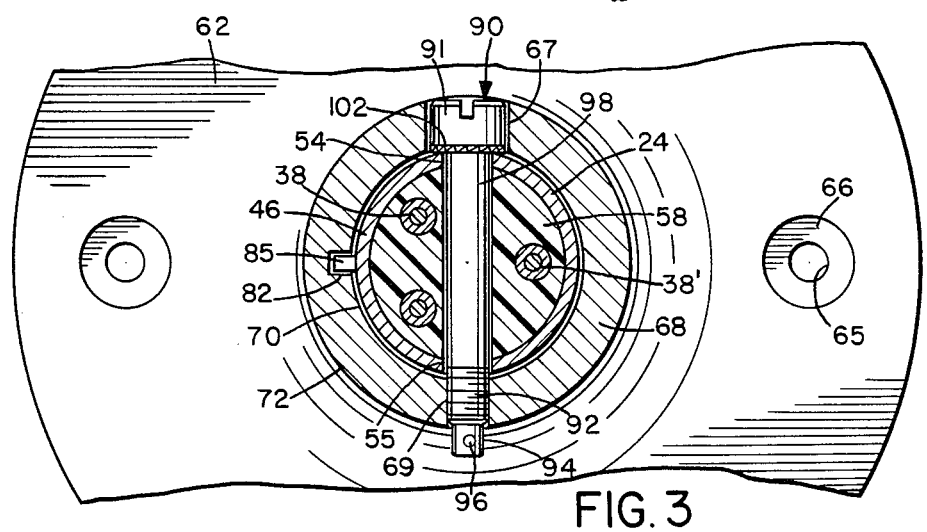
FIG. 3 is an enlarged sectional view taken on line 3—3 of FIG. 2.

Referring to FIG. 3, downrod 24 has openings or holes 54 and 55 passing laterally through the wall 46 at its lower end. Similarly, a pair of openings 67 and 69 are provided for sleeve 68. The placement of the openings is such that when the downrod 24 and the hub 60 are fitted to each other, the openings 54, 55, 67 and 69 will all be in axial alignment. Hub 60 is secured to downrod 24 by a bolt or a through-rod 90 (FIG. 4) which enters opening 67 and extends completely through the axially aligned holes, as shown in FIG. 3. The size of opening 67 of sleeve 68 is made to accommodate the head 91 of the bolt 90 when it is positioned within the axially aligned holes. Opening 69, located on the opposite wall of sleeve 68, is threaded so it may engage threads 92 at the end portion of bolt 90. Bolt 90 may also be provided with an extended end portion 94 which emerges beyond wall 72 of sleeve 68. A hole 96 transverse to the longitudinal axis of the bolt 90 may be provided for the placement of a clip or cotter pin (not shown) if desired to ensure against dislodgement of bolt 90 from the holes. The size of openings 54 and 55 closely approximates the diameter of the shank 98 of the bolt 90 such that upon the fastening of bolt 90 through the axially aligned openings, maximum contact can be made between the bolt 90 and wall 46 of downrod 24 along the interior surfaces of openings 54 and 55. With the seating of the bolt 90 in the holes, rotational movement of downrod 24 relative to sleeve 68 will be prevented. Further, electrical conductivity is assured. Between the shank 98 and head 91 of bolt 90 is the root area 100 where serrations 102 are provided to further enhance the engagement of head 91 bearing upon wall 46 of downrod 24. When bolt 90 is placed within the holes, the serrations will provide an extremely secure fastening, and will also define positive metal-to-metal contact, thus eliminating the possibility of intermittent grounding where set screws are used. The outer margin area 102 of the root of the head 91 may be chamfered together with correspondingly chamfering along the circumference of opening 54 on wall 46 of downrod 24 to positively define the alignment of the holes for the proper placement of bolt 90. This ensures that the bolt 90 can be properly seated to firmly establish its contact with wall 46. Thus, the device 22 can now be both mechanically and electrically secured.

Bolt 90 is constructed of high strength material such as steel. In one embodiment, bolt 90 is a bolt made of a heat treated alloy steel having a minimum tensile strength of 180,000 pounds per square inch (psi) and hardened to between Rockwell C-39 to -45.

Figure 5:
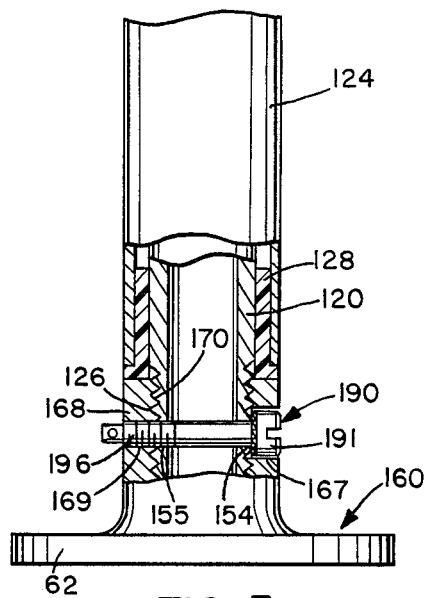
FIG. 5 is a view similar to FIG. 2, showing such a bolt used with a threaded type mounting device.

An alternative form of the present invention is illustrated in FIG. 5. This embodiment provides a downrod 124 having threads 126 at its lower end portion 120. Threads 126 engage the threads 170 on the interior wall of the sleeve 168 of hub 160. An outer sleeve or collar 128 may be provided for downrod 124 as a stop for hub 160 when it is being coupled with downrod 124. Collar 128 may also be decorative to provide an aesthetically pleasing outer appearance. The electric device is to be attached to flange 62 as described above.

A pair of holes 154 and 155 are provided at the end portion 120 of downrod 124. These holes are in axial alignment with the holes 167 and 169 on the sleeve 168 of hub 160. Similar to holes 67 and 69 of the embodiment as shown in FIG. 3, holes 167 and 169 are sized to accommodate the head 191 and end 196 respectively of bolt 190. Both the bolt end 196 and opening 169 contain interfitting threads for a secure threaded bolt engagement. As before, the root area of the bolt 190 may be serrated to further assure a rigid physical and electric connection between the downrod 124 and the hub 160.

The embodiment shown in FIG. 5 is an ideal replacement for many prior art designs of downrod-hub hanger structures which rely on interfitting threads for mutual coupling, and where a set screw has been seated in a hole on the hub to bear upon the threaded surface of the downrod for maintaining thread engagement. This prior art type of hanger structure has been particularly susceptible to having the set screw loosen, for example, when subject to the vibration of a electric fan suspended thereby. As discussed above, if this occurs and the fan is in reverse rotation countering to the thread direction, the hub can decouple from the downrod and the fan may fall. The use of the bolt 190 passing through the axially aligned holes in the downrod 124 and hub 160 eliminates this problem. With the embodiment of the present invention as shown in FIG. 5, a positive and secure mounting of the unit can therefore be assured.

The present invention is particularly useful with the device described in the above-referenced patent application. This is illustrated in FIGS. 2 and 3 where aligned and mating electrical contacts 38 and 38' are provided within the lower hollow interior portion of downrod 24 and recess 70 of the hub 60. A keyway 82 is recessed into one side of the wall 72 of sleeve 68 and serves as a guide for key 85 which projects radially outwardly from the lower end of downrod 24, as shown in FIGS. 2 and 3. The insulation material 58 contains a passage for bolt 90 to extend through the aligned holes 54, 55, 67 and 69. During installation, the attachment of hub 60 onto downrod 24 is simplified by aligning the electrical contacts with the aid of the key way 82 and key 85. Thereafter, bolt 90 is inserted into the aligned holes for its end thread engagement and to establish a positive bolt head and downrod surface contact and conductivity for electrical grounding (which also eliminates the use of set screws for grounding).

Figure 6:
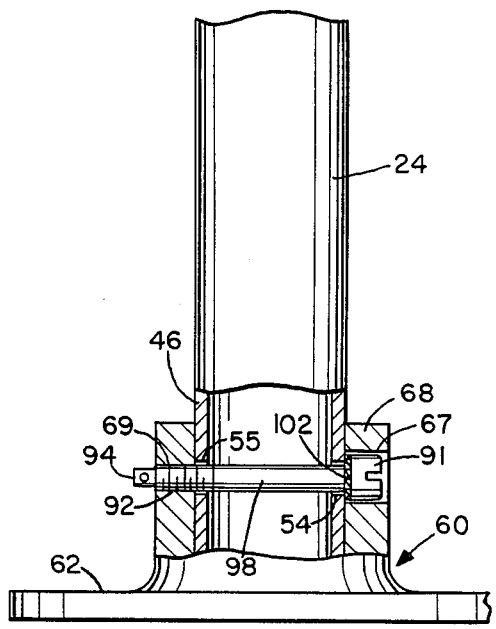
FIG. 6 is a view similar to FIG. 2 with the bolt used with an external type mounting hub.
Figure 7:
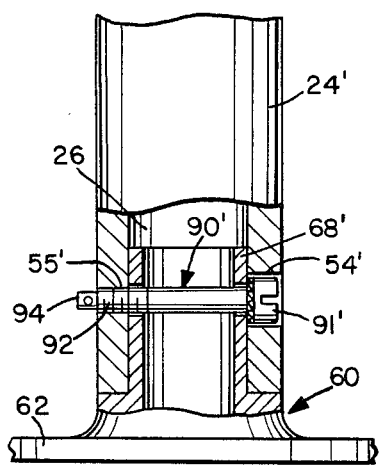
FIG. 7 is a view similar to FIG. 2 with the bolt used in an internal type mounting hub.

FIGS. 2, 3 and 5 show the male-female coupling configuration characterized by the lower portion of the downrod fitted within the central recess of the upraised sleeve of the hub. The placement of the downrod 24 within such external type of mounting hub 60 is further shown in FIG. 6. However, the present invention is not limited to only such arrangement. FIG. 7 shows an alternative embodiment where the annular sleeve 68' of hub 60' has outer dimensions such that it may fit within the hollow interior region 26 of the lower portion of downrod 24'. In this embodiment, the bolt 90' enters opening 54' of downrod 24' so a secure contact can be established between head 91' of bolt 90' and sleeve 68' of the hub 60'. At the opposite end of bolt 90' is the threaded bolt end 92' for engagement with the interior threads in opening 55' of downrod 24'.

Figure 8:
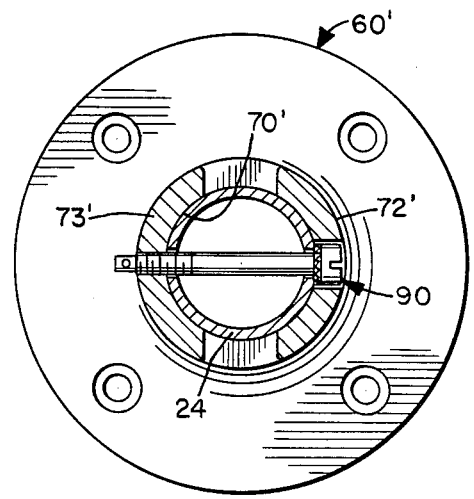
FIG. 8 is a view similar to FIG. 3, showing the bolt used in a split collar type mounting.

In another embodiment, as shown in FIG. 8, the annular wall 72 of hub 60 as shown in FIG. 3 is replaced by a socket or split collar 60' which is characterized by opposite upraised walls 72' and 73', and which provides a recessed area 70' therebetween. This configuration can provide a saving in the material of construction.

It will be evident that there are different embodiments which are not illustrated above but which are clearly within the scope and spirit of the present invention. The above description and drawings are therefore intended to be exemplary only and the scope of the invention is to be limited solely by the appended claims.

We claim:

1. Apparatus for releasably electrically and mechanically attaching an electrical device to an overhead support, comprising:
   a downrod depending downwardly from said support and attached thereto and coupling means to couple the lower end of said downrod to an upwardly extending hub on said device, said coupling means comprising a male-female joint between said downrod and said hub, said downrod and said hub having mutually interfitting walls;
   a pair of openings in opposite sides of each of said interfitting walls, said openings all being aligned; and
   rod means extending through said aligned openings, said rod means having a head at one end thereof, which passes through one opening on the outer of said downrod and hub and contacts the outer surface of the wall of the inner of said downrod and hub, with a threaded portion disposed at the end of said rod means opposite to said head for engaging an internal thread of the opposite opening on said outer of said downrod and hub, said rod means electrically and mechanically securing said downrod and said hub.

2. The invention according to claim 1 wherein said lower end of said downrod is fitted within said hub.

3. The invention according to claim 1 wherein said hub is fitted within said lower end of said downrod.

4. The invention according to claim 1 wherein said hub includes a bottom flange and a pair of spaced apart upraised walls disposed thereon, said upraised walls being interfitting with said wall of said downrod.

5. The invention according to claim 1 wherein said rod means further comprises serrations on said head for contact with said outer surface of the wall of the inner of said downrod and hub.

6. The invention according to claim 1 wherein said rod means further comprises fastening means for retaining said rod means within said aligned openings.

7. The invention according to claim 6 wherein said fastening means includes an extended end portion on said threaded end having a lateral hole and a cotter pin secured therethrough.

8. The invention according to claim 1 wherein said coupling means further comprises interfitting threads disposed along said interfitting walls.

* * * * *